United States Patent
Baldi et al.

(10) Patent No.: US 8,431,621 B2
(45) Date of Patent: Apr. 30, 2013

(54) METHOD FOR THE PREPARATION OF AQUEOUS DISPERSIONS OF TIO$_2$ IN THE FORM OF NANOPARTICLES, AND DISPERSIONS OBTAINABLE WITH THIS METHOD

(75) Inventors: Giovanni Baldi, Montespertoli (IT); Marco Bitossi, Montelupo Fiorentino (IT); Andrea Barzanti, Montelupo Fiorentino (IT)

(73) Assignee: Colorobbia Italia S.p.A., Sovigliana Vinci (IT)

( * ) Notice: Subject to any disclaimer, the term of this patent is extended or adjusted under 35 U.S.C. 154(b) by 1188 days.

(21) Appl. No.: 12/162,539

(22) PCT Filed: Jan. 29, 2007

(86) PCT No.: PCT/EP2007/050826
§ 371 (c)(1),
(2), (4) Date: Jul. 29, 2008

(87) PCT Pub. No.: WO2007/088151
PCT Pub. Date: Aug. 9, 2007

(65) Prior Publication Data
US 2008/0317959 A1    Dec. 25, 2008

(30) Foreign Application Priority Data
Feb. 1, 2006    (IT) .................. FI2006A0030

(51) Int. Cl.
*C09K 3/00*    (2006.01)
*B01J 13/00*    (2006.01)
(52) U.S. Cl.
USPC ............... 516/90; 427/372.2; 106/287.19
(58) Field of Classification Search ............ 516/90; 106/287.19
See application file for complete search history.

(56) References Cited

U.S. PATENT DOCUMENTS

| | | | |
|---|---|---|---|
| 5,718,907 A * | 2/1998 | Labarre | 424/401 |
| 6,905,814 B1 | 6/2005 | Aubay et al. | |
| 2004/0241427 A1* | 12/2004 | Zhu et al. | 428/328 |
| 2005/0163924 A1* | 7/2005 | Anderson et al. | 427/166 |

FOREIGN PATENT DOCUMENTS

| WO | 99/62822 A1 | 12/1999 |
|---|---|---|
| WO | 2006/061367 A1 | 6/2006 |

OTHER PUBLICATIONS

Zhang et al "Formation of Crystalline Nanosized Titania in Reverse Micelles at Room Temperature" J. Mater. Chem. 2002, v12, pp. 3677-3680.*
Francisco et al. (Inhibition of the Anatase-Rutile Phase Transformation with Addition of CeO2 to CuO-TiO2 System: Raman Spectroscopy, X-ray Diffraction, and Textural Studies, Chem. Mater. 2002, 14, 2514-2518).*
Kanta Rao et al. (Highly active titania supported ceria catalyst for ammoxidation of picolines, Applied Catalyst A: General 163 (1997) 123-127).*
Wang et al. (Synthesis of Anatase TiO2 Nanoparticles by Improved Sol-Gel Process at Low Temperature, Journal of Rare Earths, vol. 23, Suppl. Dec. 2005, 306-308).*
Addamo et al, "Preparation, Characterization, and Photoactivity of Polycrystalline Nanostructured TiO2 Catalysts" J. Phys. Chem. B 2004, 108, 3303-3310.
Feldmann, "Polyol-Mediated Synthesis of Nanoscale Functional Materials" Adv. Funct. Mater. 2003, 13. No. 2, February.

* cited by examiner

*Primary Examiner* — Ling Choi
*Assistant Examiner* — Chun-Cheng Wang
(74) *Attorney, Agent, or Firm* — Snell & Wilmer L.L.P.

(57) ABSTRACT

The invention relates to a method for the preparation of aqueous dispersions of TiO$_2$ in the crystalline form anatase, as well as the dispersions obtained with said method, useful for the preparation of photocatalytic coatings for surfaces, and for the photocatalytic decontamination of gases and liquids.

13 Claims, 1 Drawing Sheet

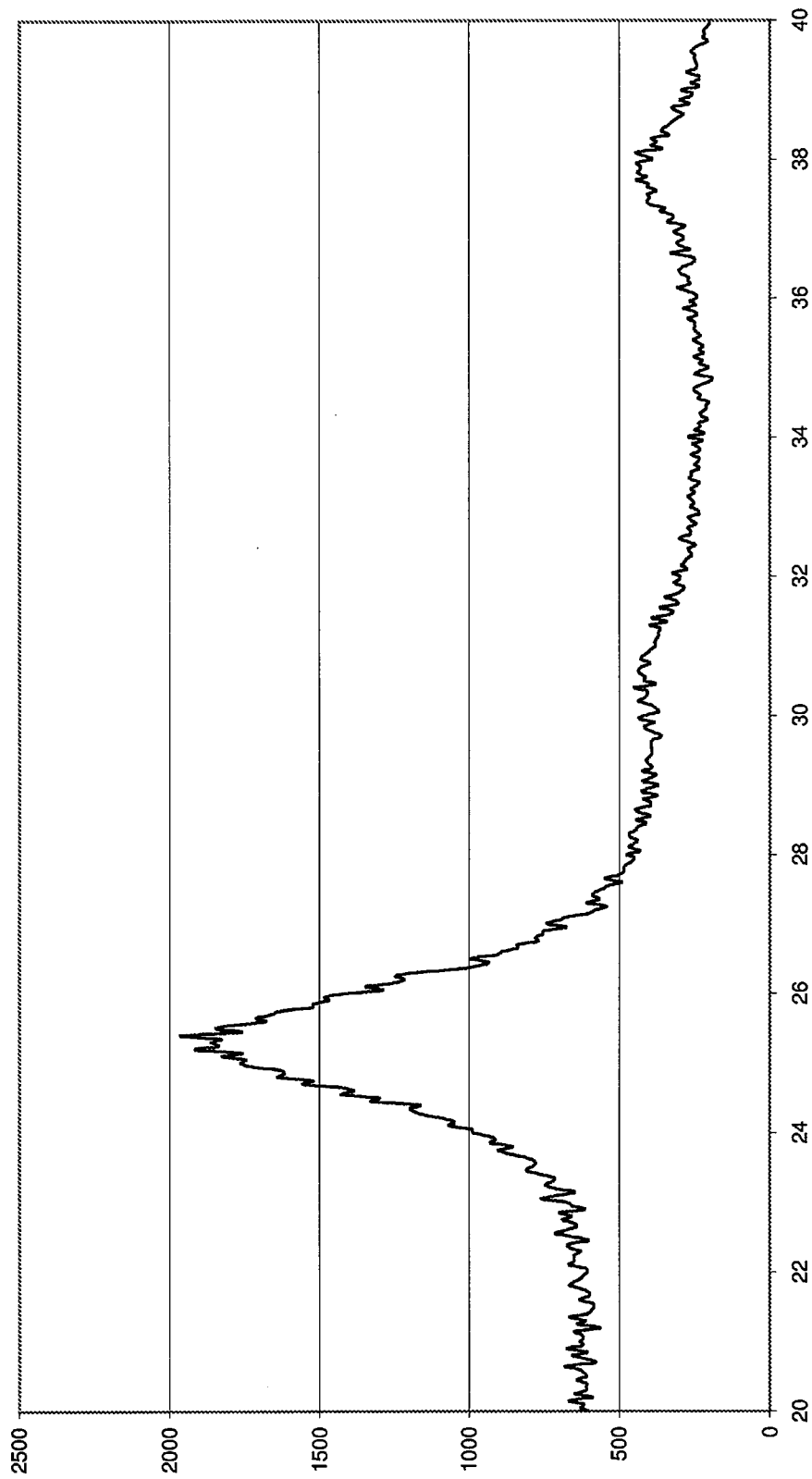

METHOD FOR THE PREPARATION OF AQUEOUS DISPERSIONS OF $TiO_2$ IN THE FORM OF NANOPARTICLES, AND DISPERSIONS OBTAINABLE WITH THIS METHOD

FIELD OF THE INVENTION

The present invention relates to the field of methods for the preparation of compounds in the form of nanometric particles, and in particular, to a method relating to a way for preparing $TiO_2$ dispersions in the form of nanoparticles.

PRIOR ART

Titanium dioxide is a white pigment with a very strong covering capacity used in particular in paints, and in the production of paper and synthetic rubber. Among the most recent applications of Titanium dioxide is the attempt to use its photocatalytic activities to best advantage, in other words, through the action of ultraviolet light, to use this capacity to generate radical species able to catalyse the oxidising degradation of harmful or toxic substances, such as benzene, dioxin, and other organic pollutants, but also unpleasant and sickness-provoking substances such as mould and bacteria. These applications are therefore used in wide environmental fields ranging from combating pollutants to detergents and sterilising products.

For these applications, Titanium dioxide is used as a coating on the surfaces to be treated in order to maximise the photocatalyctic effect. The crystalline form of Titanium dioxide called "anatase" is the most popular for this type of application because, as well as being chemically stable and easily available, it also possesses a photocatalytic activity that is higher than the other two crystalline forms, rutile and brookite.

On the other hand, the superposition of the Titanium dioxide absorption spectrum, even in anatase form, on the solar spectrum, is not very large, and this results in low photocatalytic efficiency levels. For this reason various attempts have been made to modify $TiO_2$, for example, by doping it with other metals, or by preparing the compound in question in the form of nanoparticles; in fact this increases the surface area enormously and thus, also the photocatalytic efficiency.

Several methods exist for preparing $TiO_2$ anatase, including in nanoparticle form, that provide $TiO_2$ in powder form. In order to be suitable for the preparation of photocatalytic coatings, this powder must be dispersed in an appropriate solvent and formulated with other possible additives to improve coating adhesion, but this causes the coagulation of the Titanium dioxide particles making it impossible to maintain the photocatalytic efficiency and activity of the particulate material. Moreover, over a period of time, the $TiO_2$ particles in these dispersions tend to settle in the bottom of the containers where they are stored creating stability problems during storage.

Furthermore, the patent application n° FI2004A252 (by the same Applicant) describes a method that allows the preparation of stable nanoparticle dispersions of Titanium dioxide in anatase form where water and suitable complexing solvents are used as the solvents

SUMMARY OF THE INVENTION

Recently the Applicant created a method for obtaining nanoparticles of Titanium dioxide in anatase form already dispersed in water only, and directly usable for the preparation of photocatalytic coatings. The dispersions obtained with the method according to the invention did not provoke particle coagulation even after prolonged storage, thus allowing the preparation of coatings which maintain the photocatalytic activity of the particulate material thanks to dispersion homogeneity.

Therefore the aim of the present invention is a method for the preparation of nanoparticle dispersions of Titanium dioxide in anatase form in water, wherein a Titanium alkoxide is made to react under heat in water in the presence of mineral acid and a non-ionic surfactant and where necessary, the solution is finally reduced to a small volume. A further aim of the invention is the use of the nanoparticle dispersions of Titanium dioxide in anatase form in water, obtained using this method, as well as their use for the preparation of photocatalytic surface coatings, for the photocatalytic decontamination of gases and liquids, and for the preparation of formula for cosmetics that provide a protective action against sun rays for the human skin.

The characteristics and advantages of the invention will be illustrated in detail in the following description.

BRIEF DESCRIPTION OF THE APPENDED FIGURE

FIG. 1 shows a difractogram of the dried product powder, where the y-axis shows the radiation intensity while the x-axis shows the amplitude of the radiation incidence angle. This analysis demonstrates how crystalline titanium dioxide in anatase form is obtained using this method.

DETAILED DESCRIPTION OF THE INVENTION

The method of the present invention is able to produce $TiO_2$ in anatase form directly in water, and to obtain a dispersion of $TiO_2$ particles at the end of the process with a size between 30-50 nm. Particle measurement was performed using various methods well known to those skilled in the art, such as XRD (X-Ray Diffraction), FEG-SEM (Field Emission Gun-Scanning Electron Microscopy), TEM (Transmission Electron Microscopy) and DLS (Dynamic Light Scattering). Unlike those prepared dispersing nanometric powders in the solvent mixtures or in water, these dispersions show no signs of conglomeration or coagulation and solid precipitation, even after prolonged periods of the dispersion product storage.

The advantages to be gained with dispersions of this type are obvious and associated with the photocatalytic efficiency and uniformity of the coatings that can be prepared with said dispersions. The dispersion index obtainable with the method according to the present invention, measured with DLS (Dynamic Light Scattering) techniques, is lower than 0.3, and thus the dispersion according to the invention differs from those obtained using prior methods composed of the preparation of nanoparticle powder, subsequently dispersed in solvent.

The titanium alkoxide used as the starting product in this method can be chosen from the group composed of titanium methoxide, ethoxide, normal-propoxide, iso-propoxide, normal-butoxide, and isobutoxide.

Particularly preferable is Titanium isopropoxide since it is cheaper and reacts better under the conditions used in the present method.

The non-ionic surfactants are surface-active agents composed of an apolar part and a polar function, non-ionisable ether, ester, ether-ester; particularly preferable is Triton X-100 (TX-100)

The term mineral acid according to the invention refers, for example, to an acid chosen from the group composed of: hydrochloric acid, nitric acid, sulphuric acid, perchloric acid, hydrobromic acid and hydrogen iodide; preferably halogen acids are used, and in particular hydrochloric acid.

The alcoholate molar ratio of titanium alkoxide/mineral acid is between 0.005 and 15, and preferably between 5 and 6.

The reaction temperature ranges between 15° and 95° C., preferably between 45° C. and 55° C.

Reaction times range between 12 h and 72 h, and preferably 24 h.

Where necessary, when used for coating preparations, the present dispersions can possibly be formulated using additives and diluents commonly employed in the field of surface coatings, such as adhesion improved agents or solvents such as water or ethanol for example, in order to obtain the required dilution level.

On the other hand, when used to decontaminate liquid or gaseous products, the present dispersions are adsorbed respectively on a silica gel support, or on some other suitable inorganic support with adsorbent characteristics, that is then immersed in the liquid, or placed in its current state or diluted, in containers in which the gas to be purified is bubbled through for washing.

The supports on which surface coatings prepared with the present dispersion can be applied are widely varied, from woven fibre products in rolls or already made up into garments, to ceramic products, as well as supports in glass, metal, mirror, and similar materials.

The photocatalytic activity of the surface coating according to the present invention is explained as a result of the exposure of the coating in question to light with a suitable wave length, typically less than 388 nm, which produces a surface with bacteria-proof, bacteriostatic and super-hydrophilic properties after its exposure to UV light. In fact, supports coated with $TiO_2$ show a total lack of water repellent capacity, so-called super-hydrophilic capacity, that makes surfaces treated with $TiO_2$ self-cleaning.

Moreover, given the extremely small size of the $TiO_2$ particles, the present dispersions are practically transparent, leaving the appearance of the surface on which they are applied, totally unchanged. This transparency also makes the product suitable for use in cosmetic fields for the preparation of sun filters with high UV ray protection levels.

A further advantage of the present dispersions, is their behaviour at high temperatures. In fact, the application of the surface coating on ceramic supports requires high temperature processing of the support on which the dispersion is applied and the present dispersions maintain exactly the same appearance, crystalline form of anatase and nanoparticle nature of the coating as before the heating process.

According to a particular embodiment of the present method, the Ti can be doped with a metal selected from the transition metal series, and in particular Ag, Cu and Ce by means of the addition of a salt of one of these metals to the starting solution. In this way, the method will lead to the forming of a dispersion of $TiO_2$ doped with Ag, Cu or Ce, which are able to perform their catalytic activities even without UV light rays.

Below are certain examples of the invention provided as illustrations but to be considered by no means limiting.

Example 5 grams of concentrated HCl, 7.5 grms of TX-100, and water up to a total weight of 750 grams are placed in a 2 Liter reactor heated by means of diathermal oil circulating in the external jacket. The temperature is raised to 50°°C. At this point 50 grams of $Ti[OCH(CH_3)_2]_4$ (TIP) are added very rapidly and a white flock precipitate can be seen immediately.

After 7 hours a very stable transparent sol is formed.

Characterisation

The characterisation occurs by determining the concentration of the Titanium dioxide present in the solution (ICP technique) and by determining the size of the particles (DLS technique).

Concentration: 1.5% in weight of $TiO_2$

Size: 36.67 nm with a polydispersivity index of=0.282

EXAMPLE 2

5 grams of concentrated HCl, 7.5 grams of TX-100, and water up to a total weight of 750 grams are placed in a 2 Liter reactor heated by means of diathermal oil circulating in the external jacket. The temperature is raised to 50° C. At this point 50 grams of TIP are added very rapidly and a white flock precipitate can be seen immediately.

After 24 hours a very stable transparent sol is formed.

Characterisation

Concentration: 1.45% in weight of $TiO_2$

Size: 30.26 nm with a polydispersivity index of=0.216

EXAMPLE 3

500 cc of the product obtained through hydrolysis02 synthesis is placed in the rotavapor and concentrated. The bath is heated to 40° C. and an oil-powered vacuum pump creates a vacuum in the bath.

110 cc of solution are obtained.

Characterisation

CONCENTRATION: 6.69% IN WEIGHT OF $TiO_2$

SIZE: 26.72 nm with a polydispersivity index of=0.269

EXAMPLE 4

5 grams of concentrated HCl, 1.0 gram of TX-100, and water up to a total weight of 936 grams are placed in a 2 Liter reactor heated by means of diathermal oil circulating in the external jacket. The temperature is raised to 50° C.

At this point 64 grams of TIP are added very rapidly and a white flock precipitate can be seen immediately.

After 24 hours a very stable transparent sol is formed.

Characterisation

Concentration: 1.8% in weight of $TiO_2$

Size: 49.62 nm with a polydispersivity index of=0.246

EXAMPLE 5

5 grams of concentrated HCl, and water up to a total weight of 936 grams are placed in a 2 Liter reactor heated by means of diathermal oil circulating in the external jacket. The temperature is raised to 50° C. At this point 64 grams of TIP are added very rapidly and a white flock precipitate can be seen immediately.

After 24 hours a very stable transparent sol is formed.

Characterisation

Concentration: 1.8% in weight of $TiO_2$

Size: 52.71 nm with a polydispersivity index of=0.286

EXAMPLE 6

Application of Nanoparticle Dispersion of $TiO_2$ in Water on Fabric

The suspension obtained as described in the examples 1-5 can be used for treating fabrics and make them absorbent to ultraviolet radiation which is harmful to the skin, thus reducing the risk of developing skin cancer.

15 Kg of a 0.5M solution of sodium acetate and 0.5 Kg of Pimasil (siloxane resin) are added to 13 Kg of the product prepared in water and concentrated to 6%. The compound obtained is applied to a fabric using a padding technique followed by rameuse drying. The fabric thus obtained has an UPF value comparable to 20 times the value of a non-treated fabric of the same type.

EXAMPLE 7

Application of Nanoparticle Dispersion of $TiO_2$ in Water on Ceramic or Glass Surfaces.

The suspension obtained as described in the examples 1-5 can be applied to ceramic or glass surfaces (using airbrush or dip-coating techniques) in the current concentration or diluted (with water or alcohol) The surface obtained maintains its initial characteristics because the applied layer is completely transparent. The surface assumes all the functions with photocatalytic characteristics: self-cleaning, bacteria-proof, degrading capacity for organic pollutants.

The invention claimed is:

1. A method for the preparation of stable, transparent nanoparticle dispersions of $TiO_2$ in anatase form, the method comprising the step of adding a titanium alkoxide to a solution comprising water, at least one mineral acid, and at least one non-ionic surfactant, wherein the titanium alkoxide reacts to form $TiO_2$ in anatase form, wherein the $TiO_2$ has a particle size between 30 and 50 nm, wherein the reaction has a duration of between 12 and 72 hours, and wherein the solution is at a temperature between 15° C. and 95° C.

2. The method according to claim 1, wherein the titanium alkoxide is selected from the group consisting of: titanium methoxide, titanium ethoxide, titanium normal-propoxide, titanium isopropoxide, titanium normal-butoxide, and titanium isobutoxide.

3. The method according to claim 2, wherein the titanium alkoxide is titanium isopropoxide.

4. The method according to claim 1, wherein the mineral acid is a halogen-containing acid.

5. The method according to claim 4 wherein the halogen-containing acid is HCl.

6. The method according to claim 1 wherein the non-ionic surfactant comprises either an ether or ester type polar group.

7. The method according to claim 6 wherein the temperature of the solution is a temperature between 45° C. and 55° C.

8. The method according to claim 1 wherein the molar ratio of titanium alkoxide/mineral acid is between 0.005 and 15.

9. The method according to claim 8 wherein the molar ratio of titanium aikoxide/mineral acid is between 5 and 6.

10. The method according to claim 7 wherein the reaction has a duration of 24 hours.

11. The method according to claim 1 wherein the solution further comprises a salt of Ag, Cu, or Ce.

12. A nanoparticle dispersion of $TiO_2$ in water prepared by the method of claim 11.

13. The method of claim 1 further comprising the step of removing a portion of the water to increase the concentration of the $TiO_2$ in the dispersion.

* * * * *